US007450951B2

(12) United States Patent
Vimpari

(10) Patent No.: US 7,450,951 B2
(45) Date of Patent: Nov. 11, 2008

(54) METHOD AND ARRANGEMENT FOR LOCATING A MOBILE STATION IN A PACKET-SWITCHED NETWORK AND A MOBILE STATION UTILIZING SAID METHOD

(75) Inventor: Markku Vimpari, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 762 days.

(21) Appl. No.: 10/154,592

(22) Filed: May 23, 2002

(65) Prior Publication Data

US 2002/0176407 A1 Nov. 28, 2002

(30) Foreign Application Priority Data

May 28, 2001 (FI) .................................. 20011104

(51) Int. Cl.
*H04Q 7/20* (2006.01)
(52) U.S. Cl. ........................ 455/456; 455/414; 455/425; 455/433; 455/440; 455/457; 370/353; 370/229; 370/328; 370/351; 370/352
(58) Field of Classification Search ................ 455/456, 455/456.1, 432, 433, 466, 422.1, 516, 512, 455/414, 425, 435.1, 440, 457, 560, 452; 370/352, 351, 353, 328, 349, 229; 201/213
See application file for complete search history.

(56) References Cited

U.S. PATENT DOCUMENTS

| 5,945,948 | A | | 8/1999 | Buford et al. ............... 342/457 |
| 6,308,063 | B1 | * | 10/2001 | Koistinen et al. ......... 455/422.1 |
| 6,356,761 | B1 | * | 3/2002 | Huttunen et al. .......... 455/456.1 |
| 6,608,832 | B2 | * | 8/2003 | Forslow ...................... 370/353 |
| 6,625,457 | B1 | * | 9/2003 | Raith ........................ 455/456.1 |
| 6,678,524 | B1 | * | 1/2004 | Hansson et al. ............. 455/445 |
| 7,126,940 | B2 | * | 10/2006 | Vanttinen et al. ............ 370/352 |
| 2002/0042277 | A1 | * | 4/2002 | Smith .......................... 455/456 |
| 2002/0065086 | A1 | * | 5/2002 | Vanttinen et al. ............ 455/456 |
| 2002/0110096 | A1 | * | 8/2002 | Carlsson et al. ............. 370/328 |
| 2002/0138347 | A1 | * | 9/2002 | Sakata .......................... 705/14 |
| 2002/0160775 | A1 | * | 10/2002 | Pecen et al. ................. 455/434 |
| 2003/0143996 | A1 | * | 7/2003 | Peglion ....................... 455/432 |
| 2003/0149527 | A1 | * | 8/2003 | Sikila .......................... 701/213 |
| 2003/0169725 | A1 | * | 9/2003 | Ahmavaara et al. ......... 370/352 |
| 2004/0058688 | A1 | * | 3/2004 | Silver et al. ................. 455/456 |
| 2006/0258373 | A1 | * | 11/2006 | Muhonen et al. .......... 455/456.1 |

FOREIGN PATENT DOCUMENTS

WO    WO 00/25545    5/2000

* cited by examiner

*Primary Examiner*—David Q Nguyen
(74) *Attorney, Agent, or Firm*—Perman & Green, LLP

(57) ABSTRACT

The invention relates to a method and arrangement whereby the location of a mobile station (MS, 101) operated in a packet-switched (GPRS) connection can be defined. For the duration of the location measurements, the GPRS mobile station is switched to a circuit-switched connection in the cellular network (11). The invention also comprises the transmission of the accurate map data related to the mobile station as WAP pages to the mobile station for display.

22 Claims, 3 Drawing Sheets

Figure 1:
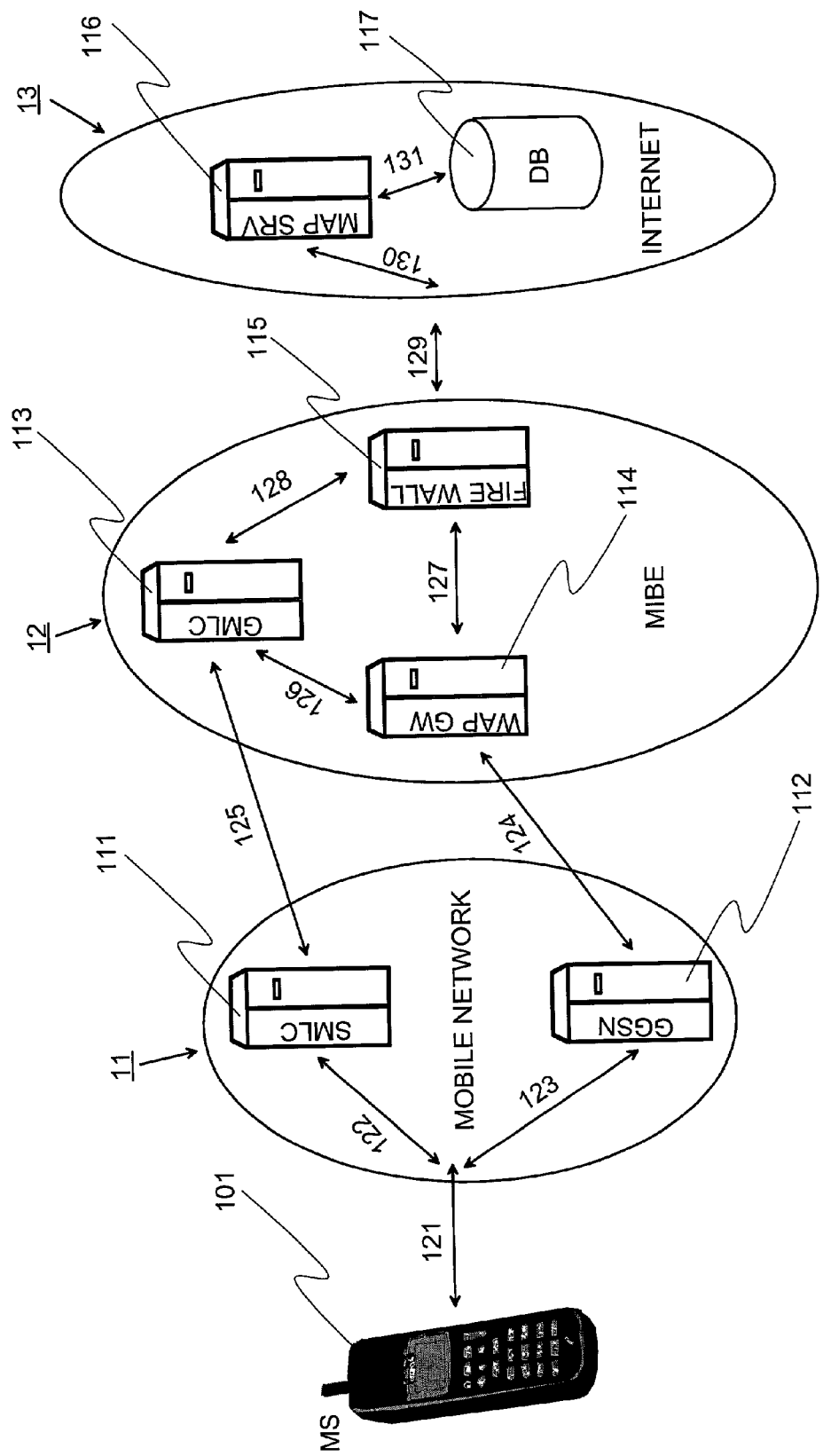

METHOD AND ARRANGEMENT FOR LOCATING A MOBILE STATION IN A PACKET-SWITCHED NETWORK AND A MOBILE STATION UTILIZING SAID METHOD

The invention relates to a method for locating a mobile station in a packet-switched cellular network, in which method there is first defined the geographical location of the mobile station, whereafter the map data connected to the defined location is transmitted from the map server, connected to the cellular network, to the mobile station. The invention also relates to a cellular radio system comprising a cellular network including its various parts as well as wireless mobile stations, in which cellular radio system the mobile stations are arranged to operate either in packet-switched data transmission (GPRS) or in circuit-switched data transmission (GSM), said mobile stations also being provided with means for realizing the location measurements of the mobile station and with means for displaying the map connected to the coordinates that were calculated by means of the location measurements. Moreover, the invention relates to a mobile station for implementing the method according to the invention.

Real-time location data is used in many different situations. For instance, for timber loads to be fetched from the forests, timber transport vehicles are provided with arrangements by means of which the driver knows how to find the correct loading site. The location data required by the driver can be provided in an electric form. The map can be loaded for example from a CD (Compact Disk) record to a suitable display device provided in the car. Also the geographical location of the car can be defined by means of for instance the GPS (Global Positioning System).Thus the defined location can be shown on top of said CD map base, in which case the driver can orientate to the desired location by means of the arrangement.

Data networks also include electric map databases, and the information contained therein can also be utilized in mobile stations. However, the sizes of such databases are so large that it is rarely sensible to transmit the map data contained therein as such to a mobile device. Too much time is consumed in the transmission of map data. Moreover, the size of the location database may be so large that it cannot as such be stored in the limited memory of the device that uses the location data. Therefore, it is essential in the described system for utilizing the location data that the user can, in one way or another, define the area from which he needs the location data. Then only said defined location database is transmitted to the desired device.

Consequently, the above described transmission and storing methods of location data cannot be applied to the prior art light cellular network mobile stations, because the storing of the information requires a fairly large-size storage hardware, such as a mass memory or a CD player.

The number of mobile stations used in various cellular networks has grown drastically. However, cellular network mobile stations can also be used as positioning means. In that case, we usually talk about the LCS services (LoCation Services) that the cellular network serving the mobile station in question can offer. Naturally the degree of required accuracy varies from case to case. In some cases, it suffices to know the area of the cellular network (the particular cell) in which the mobile station in question is located. In some cases, there is required a fairly accurate location data that can, when necessary, be presented in the form of a map, for example. Such cases are for instance accidents, where the accurate site of location is found out on the basis of the location of a given mobile station.

Among cellular networks, there are both circuit-switched CS networks, such as for instance the European GSM (Global System for Mobile communications) network, or packet-switched networks, such as GPRS (General Packet Radio Service). In packet-switched cellular networks, the location of the mobile station can always be calculated for example on the basis of the passage times or reception levels of the signals received by the mobile station from the various base stations. Some mobile station locating methods are specified in the patent publication U.S. Pat. No. 5,945,948, which describes both the locating of a mobile station on the basis of the signal passage time and the locating carried out on the basis of the arrival angles of the base station antennae in a CDMA network (Code Division Multiple Access). The described method can, however, also be utilized in GSM networks and in other cellular networks based on code division multiple access. In circuit-switched cellular networks, the mobile station is, after the data transmission connection is established, in continuous contact with at least one base station of the cellular network. Thus the measurements and other procedures required in the positioning are easily carried out.

On the other hand, packet-switched networks, such as GPRS, are well suited to rapidly transmitting the desired location data from a location database to a mobile station in the cellular network. A large amount of information can be rapidly transmitted to the mobile station for instance as WAP (Wireless Application Protocol) pages. However, a mobile station in a packet-switched network is not in a similar continuous connection with the base station network as the mobile stations in circuit-switched networks. Consequently, in packet-switched networks it is not possible to directly apply exactly same positioning methods as in circuit-switched networks.

Moreover, as regards the mobile station locating methods, for instance the specifications of the GPRS network have not been finally decided. Therefore there is a demand for procedures that can be applied in cellular networks utilizing the same basic code division multiple access technique for both GSM and GPRS mobile stations. Thus, the planning and using two different locating methods in one and the same cellular network can be avoided.

The object of the present invention is to provide a method and radio network arrangement whereby the mobile station can be located in cellular networks using both packet-switched and circuit-switched data transmission. Said location data is used for selecting among a separate location database a certain part, which is later transmitted to the mobile station of the cellular network for practical use.

The objects of the invention are achieved by means of a procedure where in connection with the definition and transmission of location data, carried out in the cellular network, there is established a circuit-switched connection also in a packet-switched network, during which connection the accurate location of the mobile station is defined. When the location is defined, the cellular network returns to packet-switched communication, during which the location data connected to the defined location is transmitted to the mobile station.

The locating method according to the invention is characterized in that in order to define the location of the mobile station, the normally packet-switched mobile station is made to operate in a circuit-switched manner for the duration of the location measurements.

The cellular radio system according to the invention is characterized in that the location measurements are arranged to be carried out during a circuit-switched data transmission connection (GSM).

The cellular radio system mobile station according to the invention is characterized in that it is provided with means for modifying the data transmission connection from a packet-switched connection (GPRS) to a circuit-switched connection (GSM) for the duration of the location measurements of the location definition process.

A few preferred embodiments of the invention are set forth in the dependent claims.

The basic idea of the invention is as follows. When a mobile station in a cellular radio system for one reason or another needs location services, in order to provide said services there is always established a circuit-switched connection between the cellular network and the mobile station that needs location services. If the connection between the mobile station and the network is packet-switched, packet-switched data transmission is only commenced after the location of the mobile station is defined by means of the circuit-switched connection. After locating, the location data required by the mobile station, for instance a map, can be rapidly transmitted by means of a packet-switched connection as WAP pages to the mobile station. When necessary, the map data can be updated, so that whenever a new map is required, the packet-switched connection is temporarily modified into a circuit-switched connection, during which the new location is defined.

An advantage of the invention is that the mobile station of a cellular network can be defined according to the same principle for both mobile stations utilizing a packet-switched connection and for those using a circuit-switched connection.

Another advantage of the invention is that only a certain part of a location database must be transmitted at a time to the mobile station.

Yet another advantage of the invention is that the location data to be transmitted, such as a map, can be rapidly transmitted as WAP pages to the mobile station that requested location.

Figure 2:
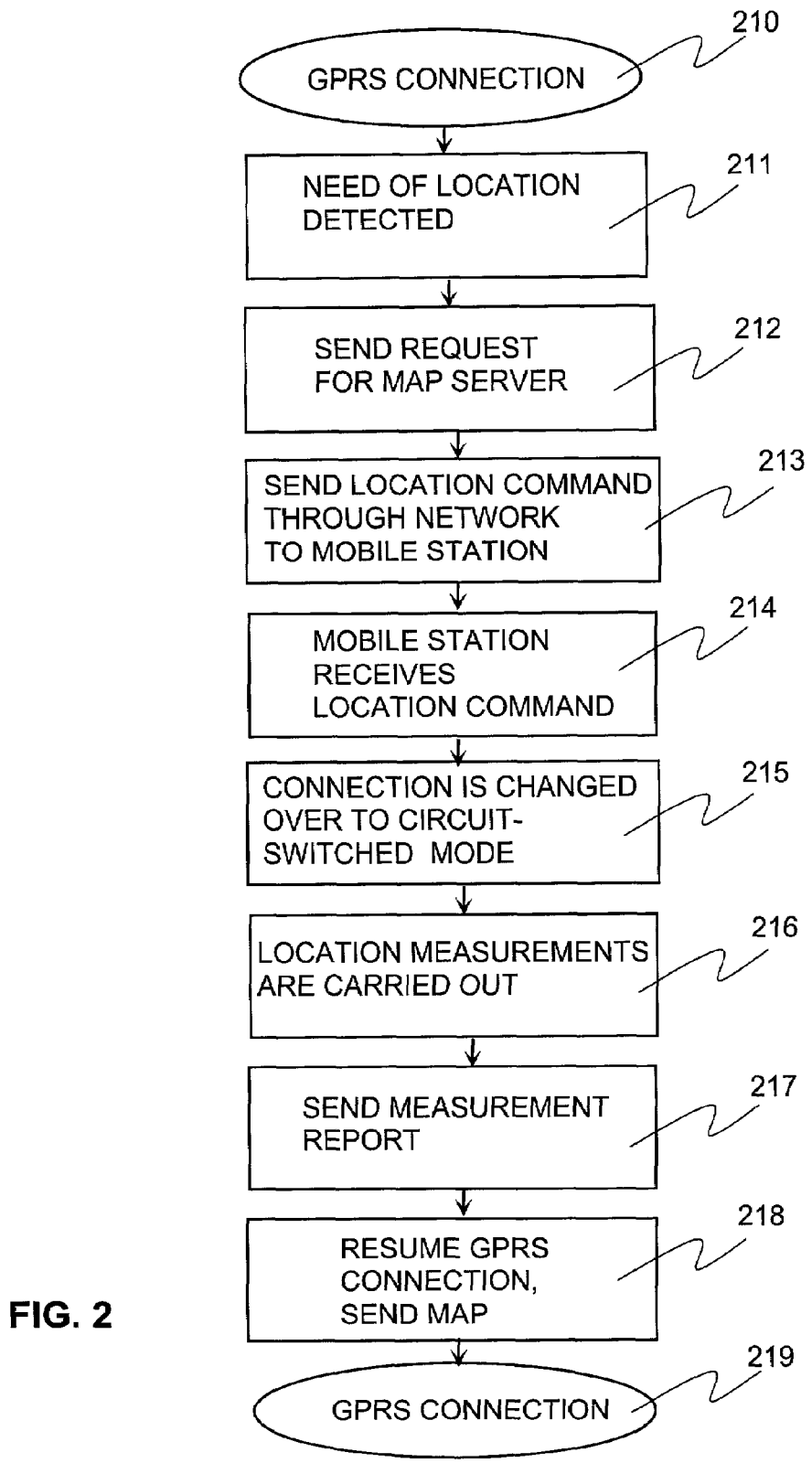
Figure 3:
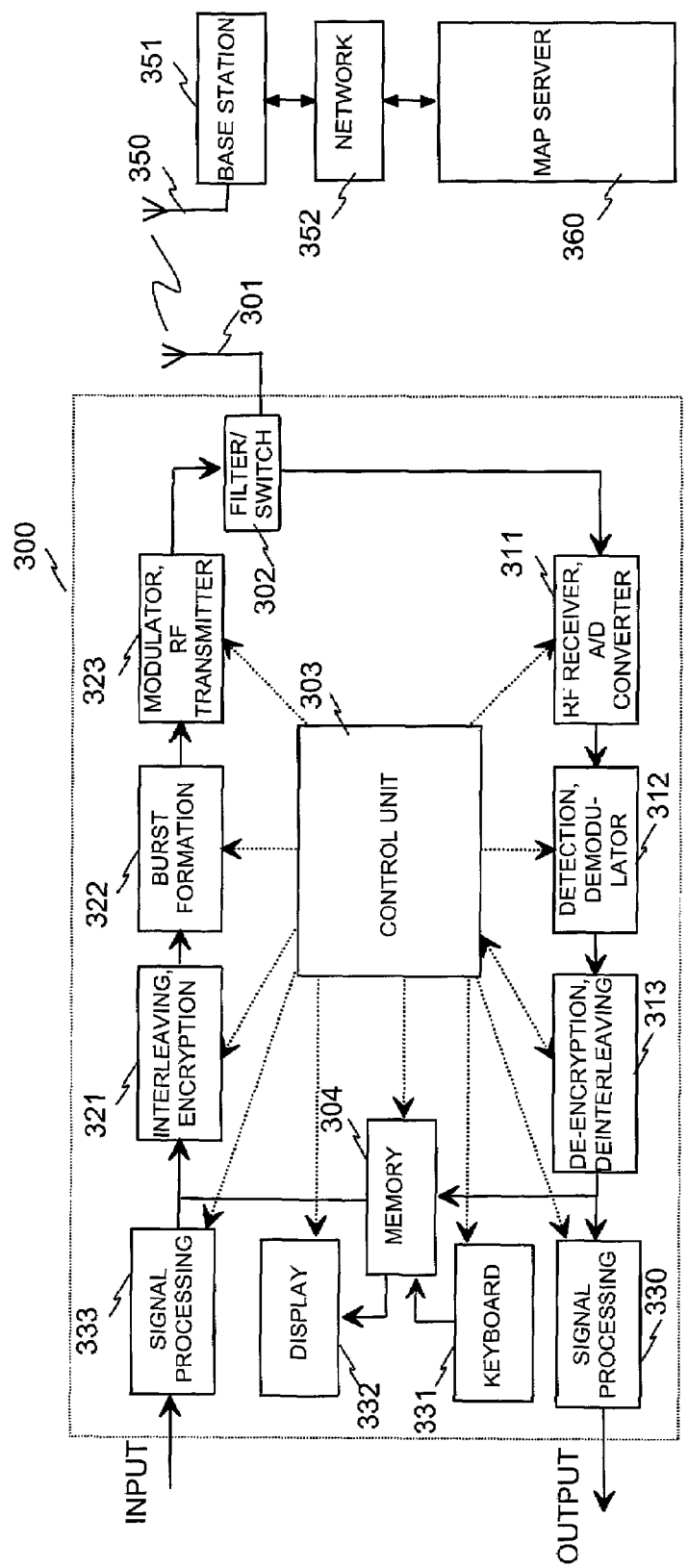

The invention is explained in more detail below. The specification refers to the appended drawings, wherein FIG. 1 illustrates, by way of example, the main parts of the locating system, FIG. 2 illustrates an exemplary flow diagram of the main steps of the locating method according to the invention, and FIG. 3 illustrates, by way of example, a cellular network mobile station applying the method according to the invention.

FIG. 1 illustrates an exemplary environment of operations where the invention is advantageously applied. A cellular network mobile station MS, 101, capable of wireless data transmission, is connected to the serving mobile network 11 (Mobile Network) either by means of a circuit-switched connection (GSM) or a packet-switched connection (GPRS) 121. Moreover, the cellular network 11 serving the mobile station is also supported by the cellular network part marked with the reference number 12, i.e. the MIBE (Mobile Internet Business Environment). From said part of the cellular network, there is advantageously provided a connection to the Internet 13, where various commercial services are available. One of the commercial services available through the Internet is the transmission of map data from a map database 117 connected to the Internet. In FIG. 1, there are shown, by way of example, only those devices or functions connected to said structures that are utilized in the operation according to the invention, which in the case of FIG. 1 takes place in the GPRS network.

In the example illustrated in FIG. 1, the mobile station MS 101 can utilize both a circuit-switched connection (GSM) and a packet-switched connection (GPRS) 121 in the cellular network 11. In a packet-switched connection, the data transmission 123 to the mobile station is carried out through the GGSN (Gateway GPRS Support Node) 112. From the GGSN 112, there is arranged a connection 124 to a WAP gateway 114 located in a MIBE environment 12, through which WAP gateway there can, when required, be arranged a connection also to external data transmission networks. The mobile station operating in the cellular network 11 is also connected 122 to a SMLC (Serving Mobile LoCation server) gateway 111, by means of which in the cellular network there is always known the particular cell where the mobile station is operating at the moment in question. From the SMLC gateway 111, the location data related to the mobile station can be transmitted, via the connection 125, to the MIBE environment 12, to the GMLC (Gateway Mobile LoCation) 113 for further use.

In the MIBE environment 12 that supports the physical cellular network 11 proper, various information related to the mobile station is transmitted between 127 the WAP gateway 114 and the firewall server 115, between 126 the WAP gateway 114 and the GMLC server 113 and between 128 the firewall server 115 and the GMLC server 113.

Advantageously the MIBE environment 12 is separated from the Internet 13 by means of a firewall server 115. In the example illustrated in FIG. 1, in the Internet 13 there operates a map server MAP SRV (MAP SeRVer) 116, which is in connection 131 with the map database DB (Data Base) 117. From this database 117, the map of a given area can be obtained in electric form. Advantageously the map server 116 can transmit map data in single WWW or WAP pages. The map data can be transmitted to a desired address within the Internet 13 or directed, via connections 130 and 129, to the firewall server 115 of the MIBE environment 12, through which it can be further transmitted, advantageously as a WAP page in a GPRS connection, to a certain mobile station 101 operating in the cellular network 11.

FIG. 2 illustrates, as an exemplary flow diagram, the main steps of the locating method according to the invention. In a case where the mobile station (MS, 101) operates in a GPRS connection, the location can be defined either in the mobile station 101 itself, or according to the location measurement data transmitted by the mobile station, by the resources 113 of the cellular network. In similar fashion, the need for locating can originate either in the mobile station 101 itself, or in some other party belonging to the network or being connected thereto. One example of such a party are rescue authorities, who could, in case of an accident, request the locating of a certain mobile station, in order to be able to send help rapidly to the right place. The above-mentioned facts do not affect the way how the locating method according to the invention itself is applied in connection with a GPRS mobile station.

In step 210 of FIG. 2, the mobile station is in a GPRS connection to a cell of the cellular network 11. Information between the mobile station 101 and the network 11 is transmitted in a packet-switched way. In step 211, the need arises to utilize the accurate geographical location data of the mobile station. Said need could be for instance acquiring map data to the display of the mobile station 101 in order to be able to orientate to a certain place. Another possible example is a situation where the location of the mobile station of a given person should be defined because of an accident. In that case the initiative for locating comes from the authorities, and the locating process is started by the network.

In both cases, to the map server 116 there is sent a map request, which is advantageously transmitted in WAP form to the map server, step 212. In order to be able to send the correct map page, the map server 116 must find out the geographical location of the mobile station indicated in the request. Therefore the map server 116 sends a locating command related to said mobile station to the cellular network in step 213. The request proceeds via the firewall server 115 to the GMLC server 113. The GMLC server transmits, via the connection 125, an inquiry to the SMLC gateway 111, which finally directs the request to the mobile station 101, and it receives the locating command in step 214.

In step 215, according to the invention, the packet-switched GPRS connection between the mobile station 101 and the cellular network 11 is changed to a circuit-switched GSM connection. The circuit-switched connection makes it possible to perform the location measurements according to a prior art method in step 216. The results from the location measurements can be processed either in the mobile station 101 or, as an alternative, the mobile station only carries out the location measurements proper and sends the measurement results to the network 11, 12 for calculating the location. In both cases, to the network 11 there is sent in step 217 a report containing either the exact location data or the location measurement data of the mobile station. From the network, the exact geographical location data is directed to the map server 116, which fetches from the database 117 the map that corresponds to the defined geographical location.

When the mobile station has transmitted the location measurements, the circuit-switched GSM connection that was required for the location measurements is torn out, and the packet-switched GPRS connection is resumed in step 218. Now the map server 116 transmits the map corresponding to the geographical location of the mobile station 101 advantageously as a WAP page to the party that requested the locating. If the request was received from the mobile station 101 itself, the map is transmitted to said mobile station for display. If the locating request was received from some other authorized party, the map is directed to the use thereof. Thus we have resumed the operation of an ordinary GPRS connection, step 219.

FIG. 3 illustrates, in a simplified block diagram, a mobile station 300 of the GSM/GPRS network according to the invention. The mobile station comprises an antenna 301 for receiving RF signals sent by the cellular network base station 351. The received RF signal is conducted, by means of the switch 302, to a RF receiver 311, where the signal is amplified and modulated to digital form. Thereafter the received signal is detected and demodulated in block 312. In block 313, the received message is de-encrypted and deinterleaved. Thereafter there is carried out the necessary signal processing in block 330. The received data can also be stored as such in the memory 304 of the mobile station 300. The control unit 303 of the mobile station performs the directing of said reception blocks according to a program stored in the control unit 303. By means of receiver blocks 311-313, the mobile station also receives the messages used in the locating process according to the invention from the cellular network base station 351.

The transmission function from the mobile station 300 takes place as follows, for instance. Under the control of the control unit 303, the block 333 performs possible signal processing for the data, and the block 321 performs interleaving and encryption for the processed signal to be transmitted. The coded data is arranged into bursts/packets, block 322, which are modulated and amplified in block 323 to form the RF signal to be transmitted. The RF signal to be transmitted is transferred to the antenna 301 by intermediation of the switch 302. Also the above-mentioned processing and transmission functions are controlled by the control unit 303 of the mobile station. By means of the transmission blocks 321-323, the mobile station also sends the messages needed in the locating process according to the invention to the cellular network base stations.

In an exemplary mobile station 300 of the GPRS network, illustrated in FIG. 3, among the essential parts with respect to the invention are the input blocks 311-313, as such representing prior art technique, by intermediation of which the mobile station receives, demodulates and decodes the messages sent by the base stations and measures the power levels of the received signals, as well as the control unit 303, which processes the information contained in the messages and controls the operation of the mobile station. In the memory 304 of the mobile station 300, there is advantageously stored the WAP page obtained from the map server, which page is advantageously displayed in the display device 332 of the mobile station 300. Part of the memory 304 of the mobile station must also be reserved for the data of neighboring cell measurements, on the basis of which either the control unit 303 of the mobile station or the SMLC location server provided in the cellular network 352 calculates the geographical location of the mobile station 300. If the mobile station itself performs the location calculations, there is needed a separate calculation application in the control unit 303. Advantageously the control unit 303 of the mobile station also comprises the means according to the invention, which set the mobile station that is normally operated in a packet-switched GPRS connection to operate as circuit-switched for the duration of the location measurements. These means according to the invention are advantageously realized by a separate application program operated in the control unit.

As compared to the prior art, the invention does not set strict requirements for the cellular network or its base stations in terms of hardware applications. However, the SMLC server located in the cellular network advantageously comprises an application program according to the invention, which program starts the mobile station locating process after receiving a locating command from the map server. Likewise, the SMLC server must, when necessary, be able to carry out location calculations on the basis of the location measurement data transmitted by the mobile station.

Naturally the above-described embodiments of the invention are given as examples only, and they do not restrict the application of the invention. In particular it is pointed out that although the examples above are related to the GSM and GPRS systems, the invention can be applied to any other digital cellular system where a packet-switched data transmission connection is used. Advantageously the invention can be applied in the future, in the so-called third generation digital cellular systems UMTS (Universal Mobile Telecommunications System).

The invention claimed is:

1. A locating method of a mobile station of a packet-switched cellular network, where first the geographical location of the mobile station is defined by location measurements performed at the mobile station, during which measurements the mobile station that is operated in a packet-switched connection is made to operate in a circuit-switched connection, whereafter the map data related to the defined location is transmitted from a map server that is in connection with the cellular network to the mobile station.

2. A method according to claim 1 wherein the process of defining the location of the mobile station comprises:

a locating request is sent to a map server, the map server sends a locating command to the mobile station, the cellular network mobile station receives the locating command, the mobile station shifts over to a circuit-switched data transmission connection, the location measurements of the mobile station are performed, the location measurement results are transmitted to the network, and the mobile station resumes the packet-switched data transmission connection.

3. A method according to claim 2 wherein the request for locating the mobile station is sent by the mobile station in WAP form to a map server.

4. A method according to claim 2 wherein the request for locating the mobile station is sent by the authorities in WWW or WAP form to a map server.

5. A method according to claim 2 wherein in the mobile station, there are calculated, on the basis of the location measurement results, the coordinates of the mobile station, which coordinates are then sent to the map server.

6. A method according to claim 2 wherein the location of the mobile station is defined in the network on the basis of the location measurement results sent by the mobile station, and the calculated coordinates of the mobile station are transmitted to the map server.

7. A method according to claim 1 wherein from the map server, there is transmitted to the mobile station a map page in WAP form, on which page the defined geographical location is situated.

8. A method according to claim 7 wherein the map page is transmitted in a packet-switched data transmission connection.

9. A method according to claim 7 wherein the employed packet-switched data transmission connection is a GPRS connection.

10. The method of claim 1 further comprising sending a report including exact location data of the mobile station and directing the data to a map server to retrieve the map that corresponds to the defined geographical location.

11. The method according to claim 1 wherein the map data comprises a geographical location map that corresponds to a deferred geographic position.

12. A cellular radio system comprising a cellular network together with its parts, as well as wireless mobile stations, in which cellular radio system the mobile stations are arranged to operate either in packet-switched data transmission or in circuit-switched data transmission, and which mobile stations are also provided with a device for performing at the mobile station location measurements of the mobile station, which location measurements are arranged to be carried out in a circuit-switched data transmission connection, and a device for displaying the map related to the coordinates calculated in the location measurements.

13. A cellular radio system according to claim 12 wherein a mobile station that is in a packet-switched data transmission is arranged to shift over to a circuit-switched data transmission for the duration of the location measurements.

14. A cellular radio system according to claim 12 wherein the cellular network is arranged to establish a data transmission connection to a map server provided in the Internet in order to fetch the map data related to the coordinate point found out by means of the location measurements.

15. A cellular radio system according to claim 14 wherein the map data is arranged to be transmitted from the map server via the cellular network to the mobile station as WAP pages.

16. The system of claim 12 further comprising a map server for retrieving the map related to the coordinates calculated in the location measurements that is stored in a database by defined geographical location.

17. A cellular radio system mobile station that is provided a device for switching to both a packet-switched data transmission network and to a circuit-switched data transmission network, and with a device for performing at the mobile station location measurements in order to define the geographical location of the mobile station, and a device for changing the data transmission connection from a packet-switched connection to a circuit-switched connection for the duration of the location measurements forming part of the location definition.

18. A mobile station according to claim 17 wherein the device for defining the geographical location of the mobile station comprises:
a device for sending the locating request in WAP form to a map server,
a device for receiving the locating command from a GMLC server,
a device for performing the location measurements, and
a device for sending the results of the location measurements to the GMLC server.

19. A mobile station according to claim 18 wherein the mobile station also comprises a device for receiving the map page obtained from the map server in WAP form through a packet-switched data transmission connection, and a device for displaying the map page.

20. The system of claim 17 further comprising a map server for retrieving the map related to the coordinates calculated in the location measurement that is stored in a database by defined geographical location.

21. The mobile station according to claim 17 wherein the local definition comprises a geographical location map that corresponds to a defined geographical position.

22. A cellular radio system mobile station that is provided with a device for switching to both a packet-switched data transmission network and to a circuit-switched data transmission network, and with a device for performing at the mobile station location measurements in order to define the geographical location of the mobile station, and it is also provided with a device for changing the data transmission connection from a packet-switched connection to a circuit-switched connection for the duration of the location measurements forming part of the location definition, wherein the device for defining the geographical location of the mobile station comprises:
a device for sending the location request in WAP form to a map server,
a device for receiving the locating command from a GMLC server,
a device for performing the location measurements, and
a device for sending the results of the location measurements to the GMLC sever.

* * * * *